United States Patent
Subbiah et al.

(10) Patent No.: US 6,538,992 B1
(45) Date of Patent: Mar. 25, 2003

(54) ADAPTIVE SCHEDULING METHOD AND APPARATUS TO SERVICE MULTILEVEL QOS IN AAL2

(75) Inventors: Baranitharan Subbiah, Chelmsford; Sudhir Dixit, Weston, both of MA (US)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/028,241

(22) Filed: Feb. 24, 1998

(51) Int. Cl.[7] ............................................. H04L 12/56
(52) U.S. Cl. ............ 370/230; 370/395.21; 370/395.64; 370/412
(58) Field of Search ................. 370/229, 230, 370/231, 235, 236, 252, 389, 395, 412, 413, 415, 420, 468, 395.21, 395.2, 395.43, 395.64, 395.6, 395.61, 395.63

(56) References Cited

U.S. PATENT DOCUMENTS

| | | | | |
|---|---|---|---|---|
| 5,499,238 A | * | 3/1996 | Shon | 370/339 |
| 5,742,772 A | * | 4/1998 | Sreenan | 709/226 |
| 5,828,653 A | * | 10/1998 | Goss | 370/230 |
| 5,898,668 A | * | 4/1999 | Shaffer | 370/230 |
| 5,926,458 A | * | 7/1999 | Yin | 370/230 |
| 5,933,425 A | * | 8/1999 | Iwata | 370/351 |
| 6,075,798 A | * | 6/2000 | Lyons et al. | 370/474 |
| 6,104,700 A | * | 8/2000 | Haddock et al. | 370/235 |
| 6,240,066 B1 | * | 5/2001 | Nagarajan et al. | 370/230 |

FOREIGN PATENT DOCUMENTS

| | | |
|---|---|---|
| EP | 0 388 951 A2 | 9/1990 |
| WO | 97/48251 | 12/1997 |

OTHER PUBLICATIONS

Baldwin, J. et al., "AAL—2—A New ATM Adaptation Layer for Small Packet Encapsulation and Multiplexing", *Bell Labs Technical Journal*, pp. 111–131 (Spring 1997).

* cited by examiner

*Primary Examiner*—Melvin Marcelo
*Assistant Examiner*—Soon-Dong Hyun
(74) *Attorney, Agent, or Firm*—Altera Law Group LLC

(57) ABSTRACT

A method and system supports multilevel QoS (Quality of Service) in transferring a plurality of packets from a local peer entity to a remote peer entity of a communication system, such as a mobile environment using AAL2. During AAL2 Negotiation Procedures (ANP), QoS requirement of each user is obtained either from the user or a computed based on the call setup and is recorded in a ANP memory. After a successful call request negotiation and after a corresponding packet is received by a AAL2 service module, the packet's QoS recorded in the memory is checked. Based on the QoS, the packet is placed into a queue of the AAL2 service module with the same QoS such that a plurality of packets having the same QoS are grouped into the same queue. The packets are transferred from the local peer entity to the remote peer entity based on different QoS requirements.

22 Claims, 2 Drawing Sheets

ADAPTIVE SCHEDULING METHOD AND APPARATUS TO SERVICE MULTILEVEL QOS IN AAL2

RELATED PATENT APPLICATION

The present invention relates to U.S. patent application entitled "METHOD AND APPARATUS FOR RESOLVING DYNAMIC CHANNEL ASSIGNMENT CONFLICT IN AAL2 NEGOTIATION PROCEDURE", Ser. No. 09/028804, filed concurrently herewith, the subject matter of which is hereby incorporated by reference. (issued; U.S. Pat. No. 6,128,659).

BACKGROUND OF THE INVENTION

1. Field of the Invention.

This invention relates in general to a method and system for servicing users' in an Asynchronous Transfer Mode (ATM) environment, and in particular, to a method and system for servicing users' with multilevel Quality of Service (QoS) requirements in a ATM Adaptive Layer 2 (AAL2).

2. Description of Related Art.

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT, namely AAL1, AAL2, AAL3/4 and AAL5. In general, the layer services provided by AAL1 are constant bit rate (CBR) services which require information to be transferred between source and destination at a constant bit rate. AAL1 technology is generally designed to satisfy concurrent or near concurrent transmission, such as related to voice transmission, which requires very high transmission speed. AAL2 offers a transfer of information with a variable bit rate. In addition, timing information is transferred between source and destination. Since the source is generating a variable bit rate (VBR), it is possible that cells are not completely filled and that filling level varies from cell to cell. AAL2 technology is generally designed to satisfy a transmission of packets with variable bit rates, often with low bit rates, such as voice/video type of transmission. AAL3/4 is used for transfer of data which is sensitive to loss, but not sensitive to delay. AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the CPCS layer. AAL3/4 and AAL5 are often designed to satisfy a secured transmission of data packets, for example, transactions in the banking industry, or aviation industry.

In a AAL2 protocol, AAL2 Negotiation Procedure (ANP) is a ITU-T recommendation for establishing peer-to-peer AAL2 channels on a single ATM connection, which is introduced in BISDN ATM Adaptation Layer 2 specification—(Annex C Dynamic allocation of AAL type 2 channels) published as a draft new recommendation I.363.2 (Madrid, November 1996) and approved in September 1997 (hereinafter "Recommendation").

In recent time, the need for supporting low bit rate and delay sensitive applications in a ATM environment has necessitated the ITU-T to propose a new AAL2 whereby packets less than ATM payload size can be packed efficiently and transmitted on a single ATM connection. The new AAL2 is generally targeted towards voice and telephony over ATM, where voice packets from different users can be multiplexed on a single ATM connection. In addition, the same AAL2 can be used to transport data packet (individually or with voice packets). The new AAL2 is designed to improve the efficiency of network resources, such as using less number of queues, and provide a cost-effective solution to customers.

In a traditional ATM network, a single ATM cell carries a packet from a single user. This is designed to provide a necessary QoS guarantee for each user. Further, this traditional one-ATM-cell for one-user at a time type of model is designed to control QoS parameters, such as delay, delay variation, and cell loss, at the ATM cell level. However, the traditional ATM networks and methods are not suitable for providing QoS in a AAL2 environment because a ATM cell carries packets from two or more users on a single ATM connection. A typical AAL2 environment generally provides about 256 channels (248 of which are generally available for the users and 8 of which are provided for system management). Using one level of QoS to serve multilevel users' QoS requirements for transferring different packets would cause some users to experience significant delay and/or other degradation below an acceptable level. With a rapid development of communication systems in a AAL2 environment, providing multilevel QoS to satisfy different users has become a very important issue. Some users may require a faster, less delay service, whereas other users may require a less cost but with moderate delay service. In existing AAL2 systems, even if the users require different QoSs for their transfer of packets, the packets are transferred with a pre-configured QoS without considering different QoS required by the users at a ATM cell level. As a result, various users' multilevel QoS requirements are not met. One solution to the problem is to adding more queues or ATM cells. However, this approach would waste network resources. Further, this approach does not help differentiate the cost to the users who demand a higher QoS from the cost to the users who demand a less QoS. Therefore, in existing systems, it is very difficult to meet QoS guarantee at a ATM cell level when a single ATM cell may contain packets from two or more users with different QoS requirements.

Also, during a network congestion, a ATM cell may be lost or dropped by the network. Since the existing ATM systems cannot differentiate a packet with a higher QoS requirement from a packet with a lower QoS requirement at the ATM cell level, the existing ATM systems cause both types of packets to be lost or dropped.

It can be seen that there is a need for a method and system to service multilevel QoS in a AAL2 network to meet individual QoS guarantee and reduce number of queues or ATM cells needed.

It can also be seen that there is a need for a method and system to service multilevel QoS in a AAL2 network such that different application services/users can specify different QoS requirements, e.g. delay constraints, delay variation constraints, cell loss constraints, or other QoS parameter constraints, which are supported by the AAL2 network in a cost effective manner.

It can further be seen that there is a need a method and system for supporting multilevel QoS in many communication environments, such as mobile, wireline trunking environments, data network environments including internet applications, or traditional telephony environments.

SUMMARY OF THE INVENTION

To overcome the limitations in the prior art described above, and to overcome other limitations that will become apparent upon reading and understanding the present specification, the present invention discloses a method and system for servicing users' in an Asynchronous Transfer Mode (ATM) environment, and in particular, to a method and system for servicing users' with multilevel Quality of Service (QoS) requirements in a ATM Adaptive Layer 2 (AAL2).

In general, the present invention solves the above-described problems by obtaining a QoS requirement of each user either from the user or computer based on a call request setup during a AAL2 Negotiation Procedures (ANP). The details on a ANP is described in the related patent application as mentioned above, which is incorporated herewith by reference. The obtained QoS requirements are stored or updated in a ANP memory (or memory table) along with other parameters, such as a Channel Identification (CID), a CID status, etc. After a successful negotiation in the ANP, a packet associated with the call request, such as a voice/data packet, is received by a AAL2 multilevel QoS service module. The packet's identification is checked, and the corresponding QoS requirement is obtained from the ANP memory. Based on the QoS requirement from the ANP memory, the packet is placed into a queue that matches the QoS requirement required by the user or closely matches the QoS requirement required by the user. The queues can be configured by a provisioning procedures based on the network operators pre-defined QoS offerings or adjustable based on the demand by the users. The present invention's per QoS queuing allows the AAL2 network operators to group users based on the QoS requirement, to meet individual QoS guarantee, and to reduce the number of queues needed. Accordingly, the present invention services packets from these queues based on the QoS. Accordingly, packets with stringent QoS requirements, such as with a requirement of immediate transmission, etc., can be serviced faster than those with flexible QoS requirements. Therefore, all the users can be compensated equally for the delays expected to be encountered to their respective destinations.

According to the present invention, delay (one of the main QoS parameters) requirements for different AAL2 users can be controlled by a Timer_CU (under Recommendation, Timer_CU is a timer composite unit) that is used in a process of packing or placing packets in a ATM cell. A packet belonging to a AAL2 user who has requested a stringent delay (i.e. no delay) is assembled in a ATM cell and immediately transmitted on the ATM connection or link. If a AAL2 user has specified a delay, e.g. 4 ms, of packing time, then a packet belonging to that user is retained in a ATM cell only for 4 ms before being transmitted to the remote peer entity. During this cell waiting time controlled by the Timer_CU, if there are no packets from the other users, then the ATM cell containing only that user's packet is transmitted immediately after 4 ms expires. Accordingly, QoS (delay) requirement for each individual user is controlled at the ATM cell level.

In addition, according to the present invention, another one of the main QoS parameters, Cell Loss Ratio (CLR), can also be controlled on an individual AAL2 user level. During a congestion of the network where there is a ATM cell loss, the present invention is able to selectively drop some packets according to their QoS requirements. For example, to avoid a network congestion, the ATM service module may drop packets from the queue with a lower QoS requirement and still allow the packets from the queue with a higher QoS requirement to be transmitted. Further, the present invention allows monitoring the details of the cell loss parameter and identifying the packet which is dropped from the ATM cell before the AAL2 connection. Accordingly, queues with different QoS values in the present invention allow a finer granularity in controlling this CLR QoS parameter.

Further, the present invention allows the AAL2 network provider to guarantee the same quality to all the users while improving the utilization of network resources. The multilevel QoS support of the present invention can also be extended to support other low bit rate applications especially from mobile terminals, telephony, and emerging technology involving in using internet to make phone calls, video conferencing, etc.

Furthermore, the present invention also allows the network provider to optimize the network resource usage and provide service quality guarantees based on customer requests. Further, this service oriented mechanism of the present invention would also benefit the network provider by enabling them to bill the user based on requested QoS parameter values.

In one embodiment, the present invention provides a method of servicing users' multilevel QoS (Quality of Service) requirements in transferring a plurality of packets from a local peer entity to a remote peer entity of a communication system. A plurality of queues having different QoS requirements are provided in a ATM service module at the local peer entity. When a plurality of call requests are received from the users for transferring the plurality of packets, the ATM service module at the local peer entity negotiates with the ATM service module at the remote peer entity. Each of the plurality of call requests has a QoS requirement and is recorded in a memory associated with the ATM module. After a successful transfer negotiation between the local peer entity and the remote peer entity, the corresponding packet is placed into one of the queues which has the same QoS requirement as the QoS requirement recorded or updated after the negotiation in the memory for the corresponding packet. Thereafter, the packet is transferred from the local peer entity to the remote peer entity according to its QoS requirement.

One aspect of the present invention is that the queues with the different QoS requirements are multiplexed in a ATM cell and transmitted via a ATM connection to the remote peer entity.

Another aspect of the present invention is that the packets with the same QoS are placed into one queue based on the QoS. If the QoS demands that the packet be transmitted immediately, the packet is placed into a ATM cell and transmitted to the remote peer entity immediately. Otherwise, the packet removed from the queue is placed into a ATM cell and transmitted to the remote peer entity when a Timer_CU runs out of time.

Further one aspect of the present invention is that the packets are voice packets with different QoS requirements, or data packets with different QoS requirements, or video packets with different QoS requirements. In alternative embodiments, the packets can be a combination of a voice packet, a data packet, and/or a video packet with different QoS requirements.

The present invention is also a system for servicing users' multilevel QoS requirements in transferring a plurality of packets from a local peer entity to a remote peer entity of a communication system. The system includes a ATM service module including a plurality of queues, each queue has a different QoS requirement. A plurality of call requests from different users are sent to the ATM service module for transferring users' packets from the local peer entity to the remote peer entity, each of the plurality of call requests having a QoS requirement. The system also includes a memory for recording/updating the QoS requirement of each of the plurality of call requests. When one of the call requests is received at the local peer entity, the corresponding QoS requirement of the one call request is recorded in the memory. After a successful transfer negotiation procedure between the local peer entity and the remote peer entity, the packet associated with the one call request is placed into one of the queues with the same QoS requirement as the QoS requirement of the packet recorded in the memory.

One aspect of the present invention is that the ATM module includes a AAL2 multiplexer for multiplexing the plurality of queues into a ATM connection to transfer the plurality of packets to the remote peer entity.

Another aspect of the present invention is that packets of the same QoS requirement are placed in the same queue, packed in a ATM cell for multiplexing, and transmitted to a remote peer entity. The packing of the packets in a ATM cell is also determined by the QoS requirement of a particular queue. If the QoS requires a less delay time, the packet(s) in the ATM cell are transmitted without waiting for the ATM cell to be completely filled with the packets from the other queues.

Further, the present invention is also an article of manufacture for a computer-based data processing system, the article of manufacture including a computer readable medium having instructions for causing a computer to perform a method comprising the steps of: providing a plurality of queues having different QoS requirements; receiving a plurality of call requests from the users for transferring the plurality of packets, each of the plurality of call requests having a QoS requirement; recording the QoS requirement of each of the call requests in a memory; receiving one of the packets from one of the users after a successful transfer negotiation between the local peer entity and the remote peer entity; placing each of the packets into one of the queues with the same QoS requirement as the QoS requirement recorded in the memory for each of the packets; and multiplexing and transferring the packets with corresponding QoS requirements from the local peer entity to the remote peer entity.

Other embodiments of a system in accordance with the principles of the invention may include alternative or optional additional aspects. One such aspect of the present invention is that the packets are voice packets with different QoS, or data packets with different QoS, or video packets with different QoS, or a combination of a voice packet, a data packet, and/or a video packet with different QoS. It will be appreciated that other equivalent alternative embodiments of the packets can be used without departure of the present invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a new approach to service multilevel QoS in a AAL2 network, especially where the packets transferred by the users are less than ATM payload size. As such, the ATM payload size can be packed efficiently and transmitted on a single ATM connection. This type of AAL2 network can also be used to target towards voice and telephony over ATM, where voice packets from different users can be multiplexed on a single ATM connection. In addition, this type of AAL2 network can be used to transport data packets individually or along with voice packets. The new AAL2 network significantly improves the efficiency of network resources and provides a cost-effective solution to customers.

The applications of the present invention can be in a mobile environment, wireline trunking environment, a data network such as internet, a telephony environment. It will be appreciated to a person skilled in the art that the present invention can be used in other appropriate areas.

The acronym used in the present invention are as follows:

QoS: Quality of Service

ATM: Asynchronous Transfer Mode

AAL2: ATM Adaptive Layer 2

ANP: AAL2 Negotiation Procedure

CID: Channel IDentification

ITU: International Telecommunications Union

CCITT: International Telephone and Telegraph Consultative Committee

CLR: Cell Loss Ratio

CBR: Constant Bit Rate

VBR: Variable Bit Rate

Figure 1:
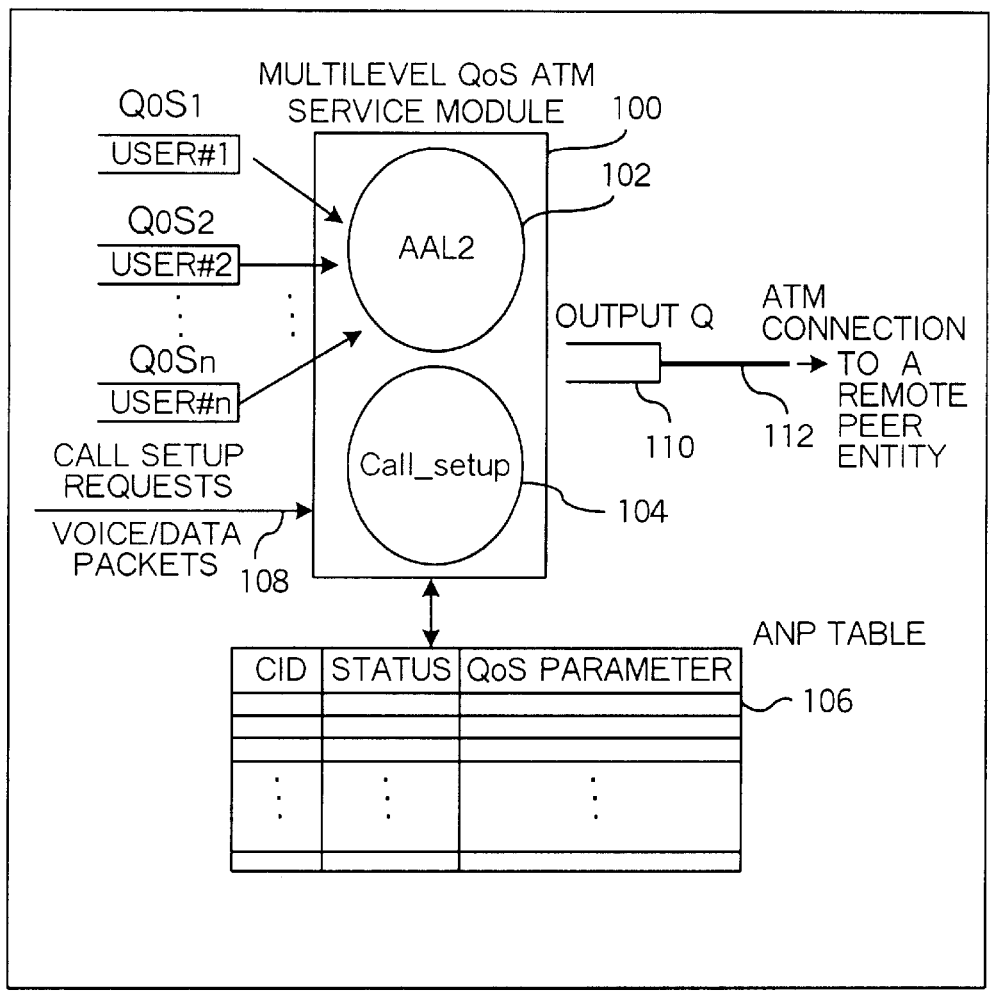
FIG. 1 illustrates a QoS queuing model for servicing users' multilevel QoS (Quality of Service) requirements in transferring a plurality of packets from a local peer entity to a remote peer entity of a communication system, in accordance with the present invention.

FIG. 1 illustrates a per QoS queuing model with having a multilevel QoS service module 100 at a local peer entity in accordance with the principles of the present invention. FIG. 1 illustrates three procedures. The first one is a call request-ANP negotiation procedure. The call request is represented by $QoS_1$, $QoS_2$, ... $QOS_n$ with the arrows pointing to a AAL2 module 102. Multiple users, User#1, User#2, ... User #n, send call requests to the multilevel QoS service module 100 for services with its own QoS requirement. Generally, the call requests are received asynchronously. A standard AAL2 network has avoided the problem resulting from the call requests arriving synchronously.

The AAL2 Negotiation Procedure (ANP) procedure is that the local peer entity negotiates with a remote peer entity for a channel assignment to transfer the packet associated with the call request. The remote peer entity either grants the channel assignment, or denies the channel assignment, or gives a waiting period for further negotiation. The details of the ANP are described in the related patent application as mentioned above, which are incorporated herewith by references. During the ANP, the QoS requirement of each user is obtained either from the corresponding user or from network QoS. In the former case, a user specifies a QoS requirement in its call request. The latter case is that when the user requested QoS is not provided by the AAL2 network, the user either accepts an alternative QoS provided by the network or delays for a while and retry with its another QoS alternative. In either case, the obtained QoS requirement is stored or updated in the ANP memory table 106 in addition to other information regarding the call request, such as a Channel Identification (CID), a CID status, etc.

A QoS parameter may include a delay parameter, a delay variation parameter, and a cell loss ratio parameter, etc. The delay parameter defines a time delay of a packet transmission between the local peer entity and the remote peer entity. The delay variation parameter defines a time delay of transmission between two signals in the packet. The cell loss ratio defines a cell (packets) loss during a network congestion.

The second procedure involved in FIG. 1 is a QoS queuing procedure. If the ANP is successful, a packet which is associated with the call request is received by the multilevel QoS service module 100 as pointed by an arrow 108. The packet's identification is checked, and its QoS requirement is then obtained from the ANP memory table 106. Based on its QoS information recorded earlier, the packet is placed into an appropriate queue of the service module 100 that closely matches the QoS required by the user. The appropriate queues are created based on an operator specified QoS offerings or based on the demands of the users. It will be appreciated that the queues can also be created by other conditions and that other means of matching of QoS between the user and the specified queue can be used without departure from the present invention. For example, the user's QoS requirement can be conditionally matched with that of the queue.

Accordingly, the multilevel QoS service module 100 services the packets by placing the packets into different queues based on the QoS. The packets having the same QoS are grouped into one queue. Thus, less number of queues are needed for servicing the same categorized users. The packets with a stringent QoS requirement can be serviced faster than the packets with a flexible QoS requirement. One of the key points is that all the users can be compensated equally for the delays that are expected to be encountered to their respective destinations. Thus, the multilevel QoS service module 100 of the present invention allows a network provider to guarantee the same quality to all the users while improving the utilization of network resources, i.e. less number of queues. Furthermore, the multilevel QoS service module 100 of the present invention can be used in classifying CBR/VBR (Constant Bit Rate/Variable Bit Rate) services over ATM. For example, if a user requests a CBR service, then voice packets belonging to that particular user can be placed in a single ATM cell payload and sent immediately to avoid any delay. Thus, the present invention also provides an operator the option to set different charging mechanisms to different users and services.

It will also be appreciated that the multilevel QoS support can be extended to support other low bit rate applications, especially from mobile terminals. For different application services, a user can specify different delay constraints which will be supported by the network in a cost effective manner. For a network provider, the present invention optimizes the network resource usage and provides service quality guarantees based on customer request. Further, a service oriented charging mechanism can also benefit a network provider by enabling them to bill customers based on their requested QoS parameter's values.

A pseudo-code description of the multilevel QoS service module at a local peer entity can be shown as follows in accordance with the above description:

```
IF call-request (call-requesting/ANPing)
    service the call request
        obtain the QoS for the ATM connection
        update the ANP table with corresponding QoS
ELSE IF user-data (being granted to packet and queuing)
        obtain the user identification
        refer the ANP table for the QoS
        place into appropriate QoS queue
    ELSE (multiplexing)
        WHILE packet-ready for service
            place packet on ATM cell payload
            IF packet on ATM cell needs immediate service THEN
                multiplex and/or transmit to remote peer en-
                tity
            ELSE
                multiplex and/or transmit with others when
                due
            END IF
                IF current ATM cell overflows
                    create new ATM cell and place the remain-
                    ing data
                END IF
        END WHILE
    END IF
END IF
```

In the multiplexing procedure, the packets packed in the ATM cell are multiplexed. Since ALL2 can be designed to service for low bit rates, the ATM cell is larger than the size of a packet. Accordingly, if the ATM cell is partially filled, the multilevel QoS service module 100 may wait until the cell is filled with some other packets based on the QoS requirement of the packet already in the ATM cell and/or the other packets. A Timer__CU controls the delay time of a packet in the ATM cell based on the QoS requirement of the packet. If the Timer__CU runs out of time, the packet or packets in the ATM cell are transmitted to the remote peer entity. If a QoS of a packet is stringent (i.e. less or no delay), the packet sent to the ATM cell is multiplexed with other packets, if any, already in the ATM cell, outputted to an output Q 110 of the multilevel QoS service module 100, and transmitted to the remote peer entity (or entities) via a ATM connection 112.

If the ATM cell overflows after a recent addition of a packet, a new ATM cell is created to place the remaining (overflows) data or the entire last packet in the new ATM cell, depending on the QoS of the recent packet.

It will also be appreciated that other pseudo-code descriptions can be used without departing from the principles of the present invention.

Figure 2:
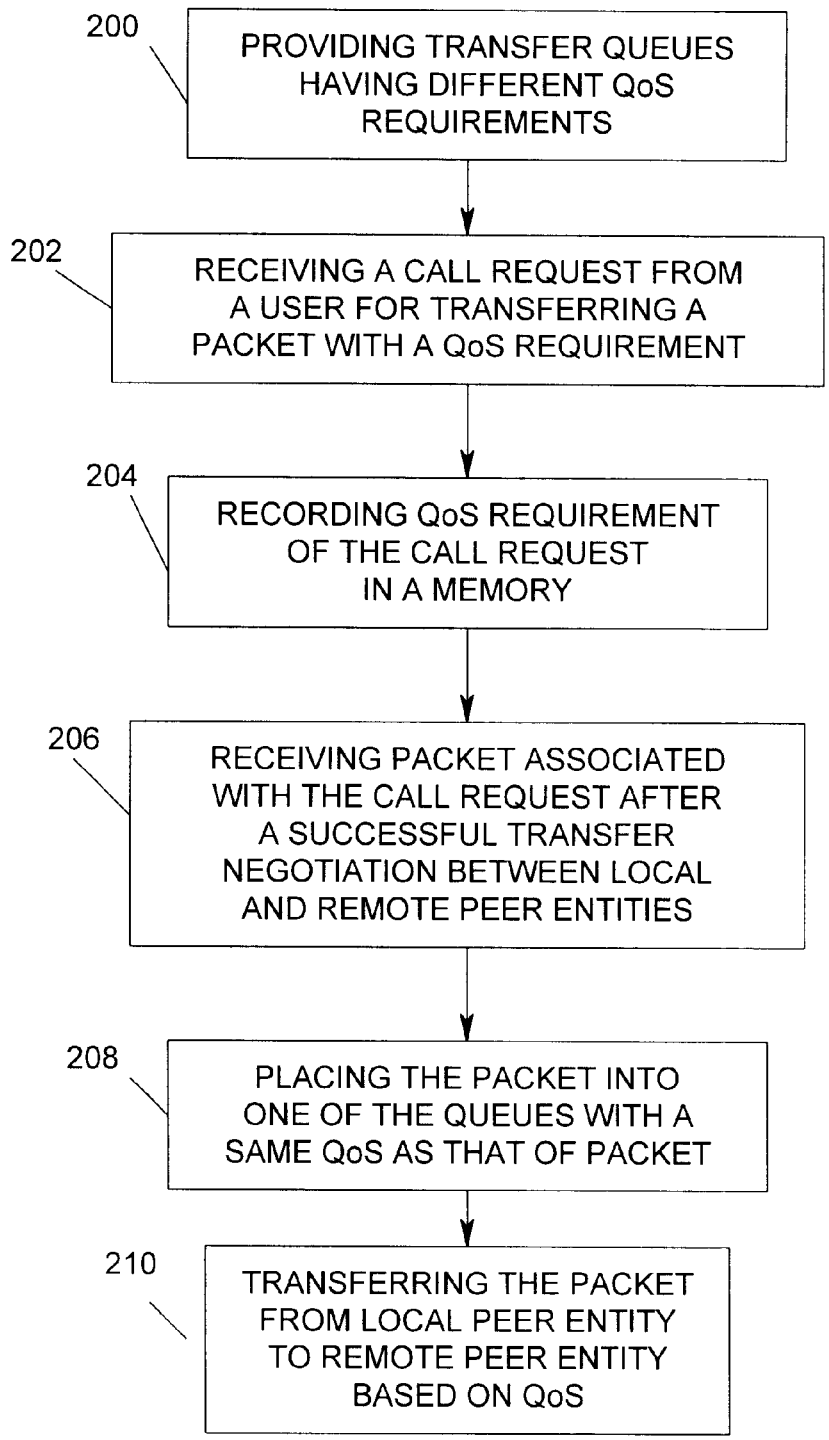
FIG. 2 is a flow chart illustrating an operation of QoS queuing model for servicing users' multilevel QoS (Quality of Service) requirements in transferring a plurality of packets from a local peer entity to a remote peer entity of a communication system, in accordance with the present invention.

FIG. 2 is a flow chart illustrating an operation of QoS queuing model for servicing users' multilevel QoS (Quality of Service) requirements in transferring a plurality of packets from a local peer entity to a remote peer entity of a communication system, in accordance with the present invention. The flow chart provides a summary of the basic operation. It is only for an illustration purpose, not for a limitation purpose.

The operation starts with box 200 where the multilevel QoS service module 100 provides a plurality of queues having different QoS requirements. When a call request is received from a user for transferring a packet with a QoS requirement as shown in box 202, the QoS requirement of the call request is recorded in a ANP memory as shown in box 204. After a successful transfer negotiation between the local and remote peer entities, a packet associated with the call request is received by the multilevel QoS service module 100 as shown in box 206. Then, the packet is placed into one of the queues with the same QoS as that of the packet as shown in box 208. At this point, the multilevel QoS service module 100 may determine whether the packet's QoS is stringent which requires immediate transmission from the local peer entity to the remote peer entity. If so, the packet is transferred (or multiplexed with the other packets if any and then transferred) to the remote peer entity immediately as shown in box 210. If not, the packet is placed and multiplexed in the ATM cell for a specified time period according to the Timer_CU defined by the QoS of the packet. After the time defined by the Timer_CU expires, the packet(s) is(are) transferred from the local peer entity to the remote peer entity as shown in box 210.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of servicing users' multilevel QoS (Quality of Service) requirements in transferring a plurality of packets from a local peer entity to a remote peer entity of a communication system, the method comprising the steps of:

providing a plurality of queues having different QoS requirements;

receiving a plurality of call requests from users for transferring the plurality of packets, each of the plurality of call requests having a QoS requirement;

recording the QoS requirement of each of the call requests in a memory;

receiving one of the packets from one of the users after a successful transfer negotiation between the local peer entity and the remote peer entity;

obtaining the QoS requirements from the memory for the packets successfully negotiated for transfer;

placing each of the packets successfully negotiated for transfer into one of the queues with a same QoS requirement as the QoS requirement obtained from the memory for each respective packet;

multiplexing one or more of the packets having like QoS requirements within each of the queues into cells having like QoS requirements; and transferring the packets via the cells according to the corresponding QoS requirements from the local peer entity to the remote peer entity.

2. The method of claim 1, wherein the multilevel QoS services in transferring of the plurality of packets are supported by using AAL2 (ATM Adaptive Layer 2).

3. The method of claim 1, wherein the multilevel QoS services in transferring of the plurality of packets are supported by using AAL2 (ATM Adaptive Layer 2).

4. The method of claim 3, wherein the queues are multiplexed into a ATM connection before transferring to the remote peer entity.

5. The method of claim 1, wherein each of the queues has a ATM cell, the placing step includes placing each of the packets into the ATM cell until a Timer_CU runs out of time, the Timer_CU being defined by the QoS of one of the packets.

6. The method of claim 1, wherein each of the queues has a ATM cell, the placing step includes placing each of the packets into the ATM cell until the ATM cell is full.

7. The method of claim 1, wherein the memory is an ANP (AAL2 Negotiation Procedure) memory having parameters including CIDs (Channel Identification), CID status, and the QoS requirements.

8. The method of claim 1, wherein the packets include voice packets whereby the voice packets have different QoS requirements.

9. The method of claim 1, wherein the packets include data packets whereby the data packets have different QoS requirements.

10. The method of claim 1, wherein the packets include video packets whereby the video packets have different QoS requirements.

11. The method of claim 1, wherein the packets include at least two packets among a voice packet, a data packet, and a video packet whereby at least the two packets have different QoS requirements.

12. A system for servicing users' multilevel QoS (Quality of Service) requirements in transferring a plurality of packets from a local peer entity to a remote peer entity of a communication system, the servicing system comprising:

a plurality of queues, each of which is arranged to have a different QoS requirement;

a plurality of call requests from the users for transferring packets from the local peer entity to the remote peer entity, each of the plurality of call requests having a QoS requirement;

a memory for recording the QoS requirement of each of the plurality of call requests;

a multiplexer at the local peer entity to combine one or more of the packets within each of the queues having corresponding QoS requirements into cells having corresponding QoS requirements; and wherein when one of the call requests is received at the local peer entity, the corresponding QoS requirement of the one call request is recorded in the memory, and after a successful transfer negotiation procedure between the local peer entity and the remote peer entity, the packet associated with the one call request is placed into one of the queues with a same QoS requirement as the QoS requirement associated with that packet retrieved from the memory, and wherein the packets in the queue are transferred to the remote peer entity via the cells based on the corresponding QoS.

13. The system of claim 12, wherein transferring of the plurality of packets are supported by using AAL2 (ATM Adaptive Layer 2).

14. The system of claim 13, wherein the local peer entity includes the plurality of queues, and wherein the cells comprising the one or more packets are transferred to the remote peer entity via a ATM connection.

15. The system of claim 12, wherein each of the plurality of packets associated with each of the plurality of call requests is placed into a ATM cell until the ATM cell is full.

16. The system of claim 12, wherein each of the plurality of packets associated with each of the plurality of call requests is placed into a ATM cell until a Timer_CU defined by one of the QoS requirements of one of the queues runs out of time.

17. The system of claim 12, wherein the memory is an ANP (AAL2 Negotiation Procedure) memory table having parameters including CIDs (Channel Identification), CID status, and the QoS requirements.

18. The system of claim 12, wherein the packets include voice packets whereby the voice packet have different QoS requirements.

19. The system of claim 12, wherein the packets include data packets whereby the data packets have different QoS requirements.

20. The system of claim 12, wherein the packets include video packets whereby the video packets have different QoS requirements.

21. The system of claim 12, wherein the packets include at least two packets among a voice packet, a data packet, and a video packet whereby at least the two packets different QoS have requirements.

22. An article of manufacture for a computer-based data processing system, the article of manufacture comprising a computer readable medium having instructions for causing a computer to perform a method comprising the steps of:

providing a plurality of queues having different QoS requirements;

receiving a plurality of call requests from users for transferring the plurality of packets, each of the plurality of call requests having a QoS requirement;

recording the QoS requirement of each of the call requests in a memory;

receiving one of the packets from one of the users after a successful transfer negotiation between the local peer entity and the remote peer entity;

obtaining the QoS requirements from the memory for the packets successfully negotiated for transfer;

placing each of the packets successfully negotiated for transfer into one of the queues with a same QoS requirement as the QoS requirement obtained from the memory for each respective packet;

multiplexing one or more of the packets having like QoS requirements within each of the queues into cells having like QoS requirements; and transferring the packets via the cells according to the corresponding QoS requirements from the local peer entity to the remote peer entity.

* * * * *